Sept. 1, 1970  J. P. McKINNON  3,526,732

ELECTRIC SWITCH STRUCTURE

Filed Oct. 9, 1967  3 Sheets-Sheet 1

Sept. 1, 1970  J. P. McKINNON  3,526,732
ELECTRIC SWITCH STRUCTURE
Filed Oct. 9, 1967  3 Sheets-Sheet 3

United States Patent Office 3,526,732
Patented Sept. 1, 1970

3,526,732
ELECTRIC SWITCH STRUCTURE
John P. McKinnon, Monroeville, Pa., assignor to Westinghouse Electric Corporation, Pittsburgh, Pa., a corporation of Pennsylvania
Filed Oct. 9, 1967, Ser. No. 673,673
Int. Cl. H01h *31/00*
U.S. Cl. 200—48                9 Claims

ABSTRACT OF THE DISCLOSURE

This invention relates to electric switches and more specifically to high voltage switches which are particularly suitable for use as grounding switches. A switch blade is supported on a rotatable shaft with the blade being disposed on the shaft to follow a generally conical path when the shaft is rotated between a first position which lies in substantially a predetermined plane and a second position which lies in substantially the same plane but is displaced from the first position.

---

In electric power systems, high voltage disconnecting switches are employed to isolate transmission lines and high voltage electrical apparatus in order to permit the inspection or repair of such apparatus or for other reasons. In order to prevent injury to maintenance or operating personnel in the event that the apparatus should be inadvertently re-energized, it is common practice to provide auxiliary grounding switches to ground the transmission line and thus to drain off any static charge that may remain after an isolating operation of the associated high voltage disconnecting switch. In the construction of grounding switches for use with high voltage disconnecting switches, such as those rated 230 kv. and above, it is desirable that the blade of the grounding switch be disposed in an out of the way and protected location when the grounding switch is in the normally open position. Where the parts that make up each pole unit of a three-phase disconnecting switch lie in generally a predetermined vertical plane, the most convenient location for the grounding switch blade associated with each pole unit would be in the same predetermined plane as the parts of the asociated pole unit adjacent to the base which supports the parts of the pole unit. A problem arises however in providing a satisfactory grounding switch blade in which the grounding switch blade is stored in the location just described when in the open position if the grounding switch blade is rotated from the open position to the closed position in the same predetermined plane as the parts of the associated pole unit of the disconnecting switch since industry standards require a minimum voltage that the equipment will withstand between the free end of the grounding switch blade and the parts of the disconnecting switch which may remain energized at a high potential during the movement of the grounding switch blade between the open and closed positions. If the grounding switch blade is stored in the same plane as the parts of the pole unit of the associated disconnecting switch and simply rotated between the open position and the closed position in the same predetermined plane, the electrical clearance or distance between the free end of the grounding switch blade and the high potential parts of the main disconnecting switch would be less than that required for industry standards with respect to the voltage that the equipment will withstand during the operation of the grounding switch. It is therefore desirable to provide an improved grounding switch structure which will both permit storage of the grounding switch blade in a convenient location in the open position and also provide the necessary electrical clearances and voltage withstand characteristics required by industry standards and which is uniquely adapted for use with high voltage disconnecting switches in which each pole unit includes parts disposed in generally the same predetermined vertical plane.

It is an object of this invention to provide a new and improved electric switch.

A more specific object of this invention is to provide a new and improved high voltage grounding switch.

A further object of this invention is to provide an improved operating mechanism for a grounding switch in which a switch blade is actuated between a substantially horizontal position and a substantially vertical position both lying in generally the same predetermined vertical plane.

Other objects of the invention will, in part, be obvious and will, in part, appear hereinafter.

For a fuller understanding of the nature and objects of the invention, reference should be had to the following detailed description taken in conjunction with the accompanying drawings, in which.

Figure 1:
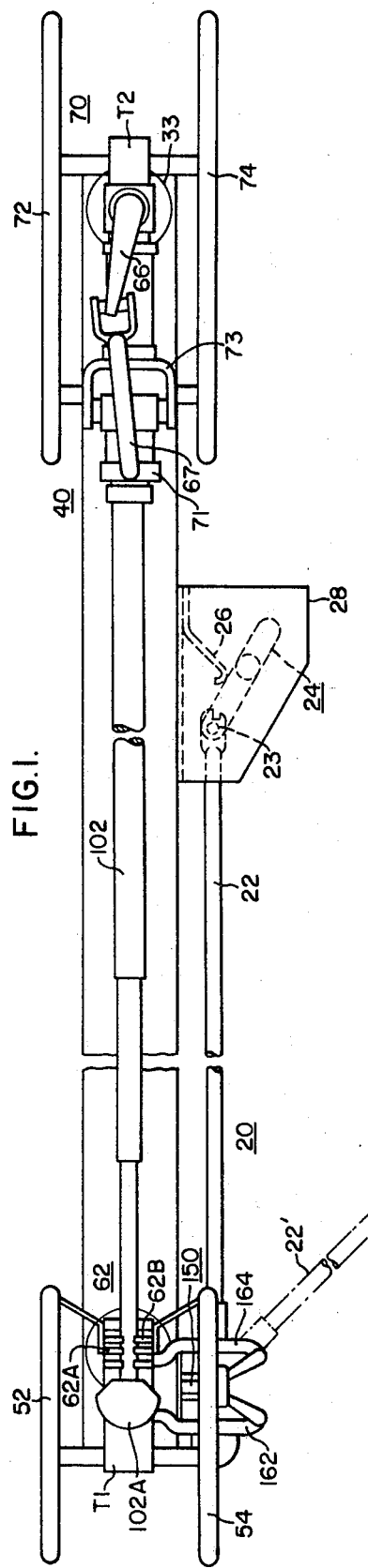
FIG. 1 is a top plan view of a grounding switch embodying the principal teachings of the invention with the grounding switch shown in the open position along with an associated high voltage disconnecting switch mounted on a common supporting means with the disconnecting switch shown in the closed position.
Figure 2:
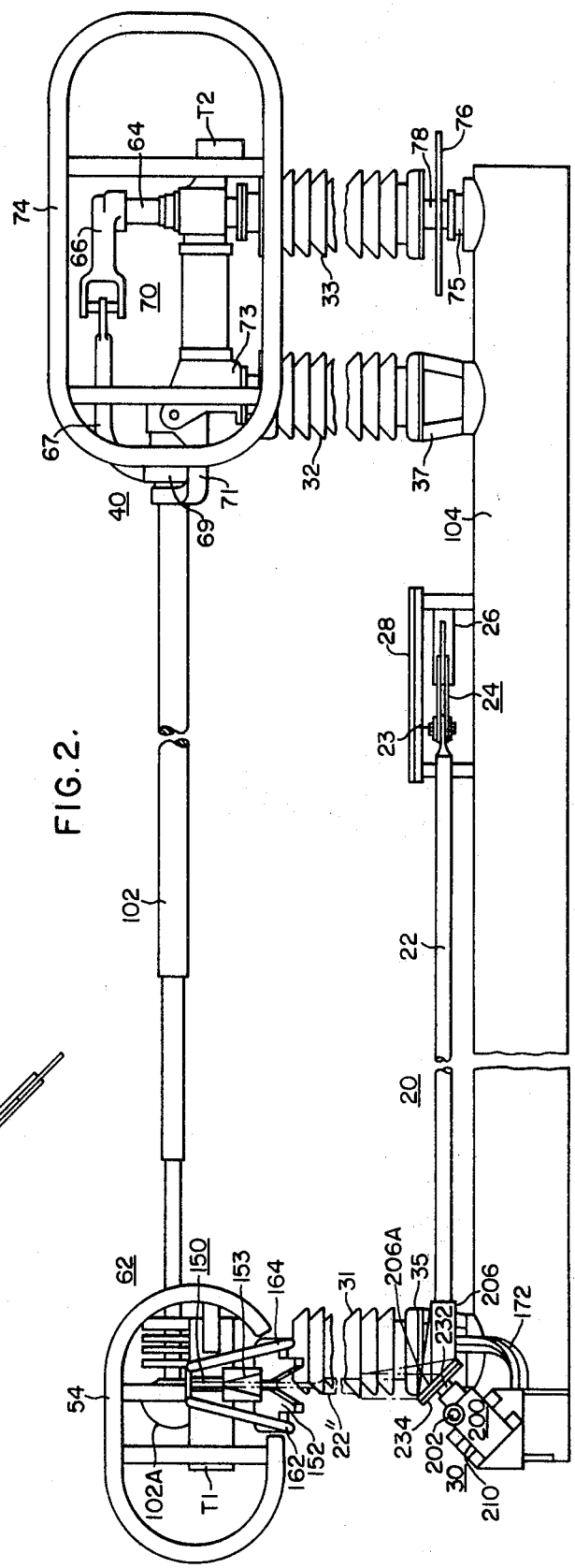
FIG. 2 is a view, in front elevation, of the grounding switch shown in FIG. 1 along with the associated high voltage disconnecting switch with the grounding switch shown in the open position and the associated disconnecting switch shown in the closed position.
Figure 3:
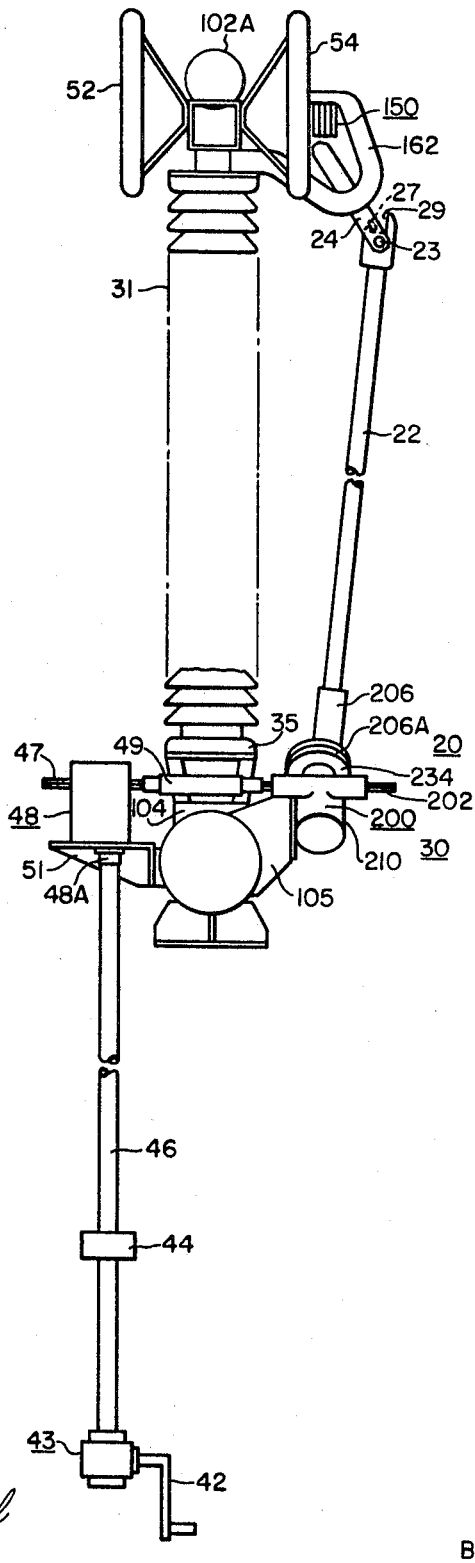
FIG. 3 is a view in end elevation of the grounding switch and the associated disconnecting switch shown in FIGS. 1 and 2 with the grounding switch shown in an intermediate operating position either approaching a fully closed position or just leaving a fully closed position.

Referring now to the drawings and FIGS. 1 through 3 in particular, the structure shown therein comprises a high voltage disconnecting switch assembly 40 and a grounding switch 20 which, as illustrated, may be of the manually operated type. The main disconnecting switch 40 may be of the type described in greater detail in U.S. Pat. No. 3,079,474 which issued Feb. 26, 1963 to E. F. Beach et al. and which is assigned to the same assignee as the present application.

As shown in FIGS. 1 through 3, the high voltage disconnecting switch assembly 40 comprises three spaced insulator stacks 31, 32 and 33 which are mounted upon a common metal base 104 and which are disposed generally in the same predetermined vertical plane. Each of the in-insulator stacks 31, 32 and 33 comprises a plurality of insulators which are preferably formed from porcelain or a similar material, the number of insulators per stack being optional depending upon the voltage of the system in which the switch 40 is to be utilized. The insulator stacks 31 and 32 are mounted upon the fixed pedestals or supporting member 35 and 37, respectively, which may, in turn, be secured to the top of the common base 104. The insulator stack 33 is fixedly mounted upon a shaft 78 with the end of the shaft 78 being rotatably mounted in a bearing member 75 which is secured to the base 104.

In order to actuate the rotation of the shaft 78 and, in turn, the rotation of the insulator stacks 33 about its own longitudinal axis, a crank arm or lever 76 is secured to the shaft 78 below the insulator stack 33 and is adapted for connection to any conventional driving means for operating the crank arm 76 to effect rotation of the shaft 78. A shaft 64 is fixedly attached to and extends upwardly from the top of the insulator stack 33 to form a rigid extension of the shaft 78. A forked crank arm 66 is mounted on the shaft 64 and forms part of the operating mechanism 70 of the main disconnecting switch 40. The crank arm 66 is operatively connected to the forked link member 67 through a ball and socket type slip joint, as described in detail in the previously mentioned patent. The link member 67, in turn, is operatively connected to a tubular blade crank member 69 which is adapted to receive one end of the switch blade 102 of the main disconnecting switch 40. The switch blade 102 is supported for rotation about its own axis by a pair of axially spaced bearings which are supported in a hinge casting 71 which in turn is pivotally supported by a hinge support member 73 which spans the insulator stacks 32 and 33. As described in the previously mentioned patent, the switch blade 102 may be actuated in an arcuate path into and out of engagement with the spaced contact jaws 62A and 62B which form part of the break contact jaw assembly 62 which is mounted at the top of the insulator stack 31 by operating the crank or lever 76 to thereby rotate the insulator stack 33.

As shown in FIGS. 1 and 2, the switch blade 102 is in the closed position and is in engagement with the contact jaws 62A and 62B. The operating mechanism 70 of the disconnecting switch 40 is so constructed that the switch blade 102 is first rotated about its own axis to disengage the end of the switch blade 102 from the spaced contact jaws 62A and 62B and is then pivotally actuated from the substantially horizontal position shown in FIGS. 1 and 2 through an arcuate path to a substantially vertical position which is displaced from the position shown in FIGS. 1 and 2 by an angle of substantially 90°. Thus, a power conductor (not shown) which may be electrically connected to a terminal means T1 mounted on the insulator stack 31 is disconnected from a power conductor (not shown) which may be electrically connected to a terminal means T2 which is mounted at the top of the insulator stack 33 and electrically connected to the other end of the switch blade 102 at the hinge end of the disconnecting switch 40.

In order to prevent corona discharge adjacent to the parts of the disconnecting switch 40 which are at high potential during the operation of the disconnecting switch 40, a pair of loop shaped corona shields or potential grading rings 72 and 74 is mounted at the top of the insulator stacks 32 and 33 on opposite sides of the parts of the disconnecting switch 40 at the hinge end of the disconnecting switch 40 which are normally energized at a high potential during the operation of the disconnecting switch 40. In order to prevent corona discharge adjacent to the parts of the disconnecting switch 40 which are normally energized at a high potential at the break end of the disconnecting switch 40 during the operation of the disconnecting switch 40, a loop shaped corona shield or potential grading ring 52 is mounted at the top of the insulator stack 31 at one side of the parts of the disconnecting switch 40 at the break end of the disconnecting switch 40 and a generally C-shaped corona shield or potential grading ring 54 is mounted at the top of the insulator stack 31 at the other side of the parts of the disconnecting switch 40 at the break end of the disconnecting switch 40, as shown in FIG. 2. It is to be noted that the corona shield 54 at the break end of the disconnecting switch 40 cooperates with a pair of corona shields or potential grading rings 162 and 164 which form part of the grounding switch 20, as will be explained in detail herein after. In addition, in order to prevent corona discharge at the free end of the switch blade 102 of the disconnecting switch 40 during the opening and closing of the disconnecting switch 40, a generally ball-shaped conducting member 102 A is mounted at the free end of the switch blade 102, as shown in FIGS. 1 and 2.

In the operation of the disconnecting switch 40, the switch blade 102 is shown in FIGS. 1 and 2 in the closed position in engagement with the contact jaws 62A and 62B of the break contact jaws assembly 62 with a continuous electrical circuit extending from the terminal T1 at the left end of the disconnecting switch 40, as viewed in FIGS. 1 and 2, through the switch blade 102 to the terminal T2 at the right end of the disconnecting switch 40, as shown in FIGS. 1 and 2. During an opening operation of the disconnecting switch 40, the crank arm or lever 76 is driven in a predetermined direction to rotate the insulator stack 33 to thereby rotate the switch blade 102 about its own axis to disengage the free end of the blade 102 from the contact jaws 62A and 62B and then to actuate the acruate movement of the switch blade 102 through the operating mechanism 70 of the disconnecting switch 40, as explained in detail in the patent previously mentioned from the closed position shown in FIGS. 1 and 2 to a substantially vertical position which is angularly displaced from the position of the switch blade 102 shown in FIGS. 1 and 2 by an angle of substantially 90° about the hinge end of the disconnecting switch 40.

It is to be noted that the arcuate or rotational movement of the switch blade 102 of the disconnecting switch 40 from the substantially horizontal position which corresponds to the closed position of the disconnecting switch 40 shown in FIGS. 1 and 2 to the substantially vertical position as just described which corresponds to the open position of the disconnecting switch 40 lies in a substantially vertical predetermined plane which the insulator stacks 31, 32 and 33 and the other operating parts of the disconnecting switch 40 are generally disposed. A closing operation of the disconnecting switch 40 from the substantially vertical open position just described to the closed position shown in FIGS. 1 and 2 would be accomplished by rotating the crank arm or lever 76 from the operating position which corresponds to the substantially vertical open position of the switch blade 102 in a predetermined direction to thereby actuate the arcuate movement of the switch blade 102 from the substantially vertical opening position just described in a counterclockwise direction about the hinge end of the disconnecting switch back to the normally closed position shown in FIGS. 1 and 2 with the generally arcuate path of the switch blade 102 during the closing operation lying in the same predetermined substantially vertical plane just mentioned with the blade 102 being finally rotated about its own axis to establish adequate contact pressure between the free end of the blade 102 and the contact jaws 62A and 62B. It is also to be noted that when the switch blade 102 is in a substantially vertical open position just described, the electrical circuit which extends between the terminals T1 and T2 when the disconnecting switch 40 is in the closed position shown in FIGS. 1 and 2 is interrupted and an electrically insulating gap is interposed between the parts of the disconnecting switch 40 at the break end which includes the terminal T1 and the parts of the disconnecting switch 40 at the hinge or right end of the disconnecting switch 40 which includes the terminal T2. When the disconnecting switch 40 is in the open position just described, the parts of the disconnecting switch 40 either at the break end or at the hinge end may be energized at a relatively high potential in a particular application.

As explained previously, it is desirable under certain circumstances to ground the line or apparatus which may be electrically connected to the terminal T1 after the terminal T1 has been isolated by the opening of the main disconnecting switch 40 in order to drain off any static charge that may remain and to prevent injury to operating or maintenance personnel in the event that the apparatus which is electrically connected to the terminal T1 should be accidently or inadvertently re-energized. The grounding switch 20 is provided to perform the necessary grounding operation.

As shown in FIGS. 1, 2 and 3, the grounding switch 20 in general comprises a rotatable switch blade or movable contact arm 22 which is disposed to be actuated from a normally open position which is substantially horizontal, as shown in FIG. 2, to a closed position which is substantially vertical and in which the switch blade 22 of the grounding switch 20 engages a relatively stationary contact assembly 150 which is mounted at the top of the insulator stack 31, as shown in FIGS. 2 and 3. It is to be noted that the parts of the grounding switch 20 may be supported on the same common base 104 as that on which the parts of the disconnecting switch 40 are supported and that the base 104 may be supported, in turn, by a suitable structural framework (not shown).

In order to actuate the switch blade 22 of the grounding switch 20 between the open and closed positions of the grounding switch 20, the operating mechanism 30 may be provided, as shown generally in FIGS. 2 and 3. The operating mechanism 30 of the grounding switch 20 may be manually operated by a hand crank 42, as shown in FIG. 3, which is operatively connected to a substantialy vertical drive shaft 46 through a gear box or assembly 43 which may be of a conventional type that includes a pair of miter gears to change the direction of the driving torque. As illustrated in FIG. 3, the vertical drive shaft 46 may pass through a position and stop indicator 44 and is operatively connected to the input shaft 48A of a gear assembly 48 having a substantially horizontal output shaft 47. The gear assembly or gear box 48 may be supported on a bracket member 51 which, in turn, may be supported on and secured to the common base support 104, as best shown in FIG. 3, and may be of a conventional type which includes a pair of miter gears to change the direction of the driving torque which is transmitted from the substantially vertical drive shaft 46 to the substantially horizontal output shaft 47 of the gear assembly 48. The output shaft 47 of the gear assembly 48, in turn, is operatively connected to the operating mechanism 30 of the grounding switch 20 by a suitable coupling means, as indicated at 49 in FIG. 3. More specifically, the output shaft 47 of the gear assembly 48 is operatively connected by the coupling 49 to the input shaft 202 which forms part of the gear box assembly 200 of the operating mechanism 30 of the grounding switch 20.

In general, the gear box assembly 200 is provided to change the direction of the driving torque transmitted from the output shaft 47 of the gear box assembly 48 and received at the input shaft 202 of the gear box assembly 200 and to support the switch blade 22 of the grounding switch 20 for rotation about a fixed axis which preferably intersects the longitudinal axis of the switch blade 22 at an angle of substantially 45°. In this instance, the gear box asembly 200 also supports the switch blade 22 for rotation about a fixed axis which intersects both a substantially horizontal axis and a substantially vertical axis at an angle of substantially 45°.

Figure 4:
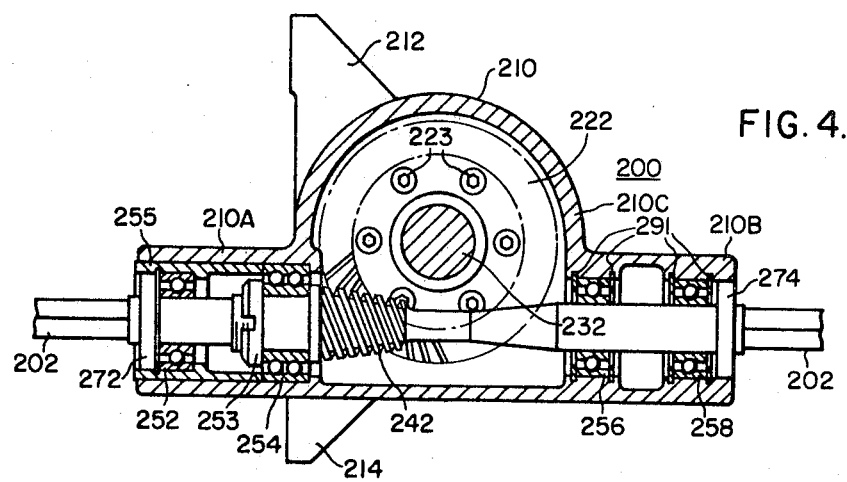
FIG. 4 is an enlarged sectional view of the portion of the operating mechanism of the grounding switch shown in FIGS. 1 through 3.
Figure 5:
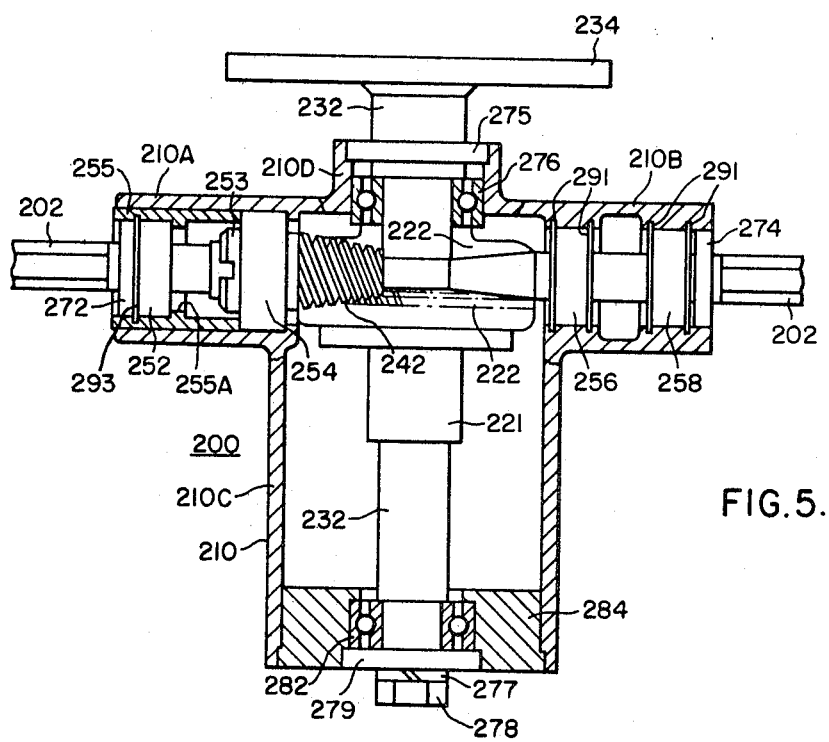
FIG. 5 is an enlarged view, partly in front elevation and partly in section, of the structure shown in FIG. 4.

More specifically, the gear box assembly 200 includes a gear box housing 210 which may be supported on a bracket member 105, as shown in FIG. 3, which, in turn, is secured to and supported by the common base 104. The gear box housing 210 includes a generally tubular main body portion 210C which is disposed at generally a right angle with respect to the longitudinal axis of the input shaft 202 of the gear box assembly 200 and the first and second generally tubular housing portions 210A and 210B through which the input shaft 202 passes and which are disposed generally parallel to the axis of the input shaft 202. The input shaft 202 of the gear box asembly 200 is rotatably supported in the tubular housing portions 210A and 210B of the gear box housing 210 by a plurality of axially spaced ball bearing asemblies 252, 254, 256 and 258, as best shown in FIGS. 4 and 5 with the inner race of each of said bearing assemblies being secured to the shaft 202 for rotation therewith and with the outer race of each of said bearing assemblies being held in a relatively stationary position with respect to the adjacent tubular housing portion. The ball bearing assemblies 256 and 258 are retained in their axial positions inside the tubular housing portion 210B of the gear box housing 210 by a plurality of axially spaced retaining rings 291 which are assembled in axially spaced grooves provided on the inside of the tubular housing portion 210B on the opposite sides of each of the ball bearing assemblies 256 and 258. An oil seal 274 may be provided at the outer end of the tubular housing portion 210B around the input shaft 202, as shown in FIGS. 4 and 5.

In order to assist in retaining the input shaft 202 in assembled relation with the other parts of the gear box assembly 200, a lock nut 253 may be mounted on a threaded portion on a shaft 202 on one side of the ball bearing assembly 254 with the other side of the ball bearing assembly 254 bearing against a shoulder provided on the input shaft 202. The ball bearing assembly 254 is retained in its proper axial position with respect to the shaft 202 by a generally tubular retaining member 255 which is disposed inside the tubular portion 210A of the gear box housing 210 as shown in FIGS. 4 and 5 with the externally threaded surface of the retaining member 255 engaging the internally threaded portion of the tubular housing portion 210A and with the right end of the retaining member 255 bearing against the ball bearing assembly 254. In order to retain the ball bearing assembly 252 in its proper axial position, a retaining ring 293 may be disposed inside the retaining member 255 in a groove provided for that purpose with the other side of the ball bearing assembly 252 bearing against an inwardly projecting flange portion 255A provided on the retaining member 255. An oil seal 272 may be provided at the outer end of the tubular portion 210A around the input shaft 202, as shown in FIGS. 4 and 5.

The output shaft 232 of the gear box assembly 200 passes through the main body portion 210C of the gear box housing 210 with the axis of the ouput shaft 232 being disposed at generally a right angle with respect to the axis of the input shaft 202, as shown in FIG. 5, and being radially spaced therefrom, as best shown in FIG. 4. The output shaft 232 may be rotatably supported at its lower end as viewed in FIG. 5, by a ball bearing assembly 282 which, in turn, is supported between a generally tubular bearing mounting member 284 which may be secured to the main body portion 210C of the gear box housing 210 by suitable means, such as transversely extending bolts (not shown) and a bearing retaining member 279 which may be secured to the lower end of the output shaft 232 by suitable means, such as a volt 278 and a lock washer 277. The output shaft 232 may be rotatably supported adjacent to its upper end, as viewed in FIG. 5, by a ball bearing assembly 276 which is disposed inside a housing portion 210D of reduced cross-section through which the output shaft 232 passes axially. The ball bearing assembly 276 may be retained in its axial position with respect to the shaft 232 between a shoulder provided on the output shaft 232 and a spiral gear 222 which is mounted on the shaft 232 for rotation therewith. The inner race of each of the bearing assemblies 276 and 282 is secured to the shaft 232 for rotation therewith, while the outer race of each of said bearing assemblies is held in a relatively stationary position with respect to the adjacent housing portions.

In order to actuate or drive the output shaft 232 when the input shaft 232 is rotated or driven, the input shaft 202 has mounted thereon or formed integrally therewith in the intermediate portion thereof a tapered pinion gear 242 which may be of the hypoid type or may be of the type which is sold under the trademark "Spiroid." The teeth of the gear 242 are disposed to engage the teeth of a driven face-type gear 222 which is mounted on the output shaft 232. The pinion gear 242 as illustrated is a type of driving which in combination with the gear 222 permits the non-intersecting shafts 202 and 232 to pass each other transversely as shown in FIGS. 4 and 5 while providing increased bearing surfaces between the teeth of the respective gears. The gear 222 is secured to a generally tubular gear mounting member 221 by suitable means such as the bolts 223 shown in FIG. 4, and the gear mounting member 221, in turn, is secured to and supported on the output shaft 232 by suitable means, such as as keying. In order to mount the support member 206 which supports the switch blade 22 of the grounding switch 20 on the output shaft 232 of the gear box assembly 200, a flange member 234 is mounted at the upper end of the shaft 232 as viewed in FIG. 5, and secured to the shaft 232 by suitable means, such as welding or bolts. An oil seal 275 may be disposed adjacent to the upper end of the shaft 232 around the shaft 232 inside the generally tubular housing portion 210D. It is to be noted that the gear box housing 210 may include integral supporting feet 212 and 214 as shown in FIG. 4 which may be secured to the bracket member 105 shown in FIG. 3 by suitable means, such as bolts.

In order to fixedly support the switch blade 22 of the grounding switch 20 on the output shaft 232 of the gear box assembly 200, a generally tubular support member 206 is mounted on the output shaft 232 and is adapted to receive one end of the switch blade 22 of the grounding switch 20. More specifically, the support member 206 includes a flange portion 206A which may be secured to the flange 234 at the upper end of the output shaft 232 by suitable means, such as bolts (not shown). As best shown in FIG. 2, the left end of the switch blade 22 of the grounding switch 20 is disposed inside the tubular portion of the supporting member 206. The switch blade 22 of the grounding switch 20 may be secured to the supporting member 206 by suitable means, such as bolts (not shown) which pass transversely through both the supporting member 206 and the switch blade 22 or the supporting member 206 may be provided with an axially extending slot (not shown) which may be drawn together at the opposite sides to clamp the switch blade 22 by suitable means, such as bolts (not shown) which pass transversely between the opposite sides of the supporting member 206 adjacent to such a slot where provided. As previously mentioned, the switch blade 22 is supported on the shaft 232 for rotation about a fixed axis which is the axis of rotation of the shaft 232 with the axis of the shaft 232 preferably intersecting the longitudinal axis of the switch blade 22 at an angle of substantially 45°. It is to be understood that in a particular application the angle between the longitudinal axis of the switch blade 22 and the axis of rotation of the shaft 232 may be slightly greater or less than 45°, such as plus or minus 1°.

In order to provide an electrically conducting path between the end of the switch blade 22 which is pivotally supported on the shaft 232 and a ground terminal (not shown) provided on the supporting base 104, the flexible conducting straps 172 are secured at one end to the switch blade 22 by suitable means, such as bolts, and at the other end to the ground terminal provided on the supporting base 104. The flexible conducting straps 172 maintain an electrically conducting path between the ground terminal provided on the relatively stationary supporting structure 104 and the switch blade 22 of the grounding switch 20 during all operating conditions.

In order to facilitate the opening and closing operation of the grounding switch 20 and to assist in establishing adequate contact pressure between the free end of the switch blade 22 and the relatively stationary contact assembly 150 of the grounding switch 20, an auxiliary blade portion or tip portion 24 is disposed at the free end of the switch blade 22 and is pivotally supported at the free end of the switch blade 22 by the pivot pin 23 for limited rotation with respect to the switch blade 22. As best shown in FIG. 3, a slot or recess 29 is provided at the free end of the switch blade 22 in which a stop pin 27 which is mounted on the auxiliary blade portion 24 is disposed to travel during the operation of the grounding switch 22. In order to frictionally retain the auxiliary switch blade portion 24 in whatever angular position the auxiliary blade portion is actuated to during the operation of the grounding switch, suitable means such as spring washers may be disposed on the pivot pin 23 at the opposite side of the auxiliary blade portion 24. In order to actuate the rotation of the auxiliary blade portion 24 to the position shown in FIG. 1 in which the auxiliary blade portion 24 is disposed at a predetermined obtuse angle with respect to the longitudinal axis of the switch blade 22, the biasing member 26 is provided and mounted on the common supporting base 104 to project therefrom and engage the auxiliary blade portion 24 when the switch blade 22 is in the normally open position, as shown in FIGS. 1 and 2. The switch blade 22 and the auxiliary blade portion together comprise an overall ground switch blade of the grounding switch 20 and form a toggle means with the pivot pin 23 being disposed at the knee of the toggle means thus formed.

In order to prevent adverse weather conditions such as ice and snow from interfering with the operation of the auxiliary blade portion 24 at the free end of the switch blade 22, the shield member or hood 28 may be provided adjacent to the free end of the switch blade 22 when the switch blade 22 is in the normally open position and secured to the common supporting base 104 to cover and protect the free end of the switch blade 22 and the associated auxiliary blade portion 24 as shown in FIGS. 1 and 2.

In order to guide the movement of the switch blade 22 and the associated auxiliary blade portion 24 into engagement with the stationary contact assembly 150 which is mounted at the upper end of the insulator stack 31, the blade guide members 152 and 153 each of which includes a generally V-shaped slot are disposed at the upper end of the insulator stack 31 adjacent to the stationary contact assembly 150. As previously mentioned, the grounding switch 20 also includes a pair of corona shields 162 and 164 which are disposed at the opposite sides of the stationary contact assembly 150 with the corona shields 162 and 164 also forming the only electrically conducting path between the stationary contact assembly 150 and the conducting parts or terminal T1 of the disconnecting switch 40 at the break end of the disconnecting switch, as explained in detail in my copending application Ser. No. 673,675, filed concurrently with this application which issued Mar. 31, 1970 as U.S. Pat. 3,504,142 and which is assigned to the same assignee as this application. The corona shields 162 and 164 are shaped to provide respective magnetic fluxes which interact with the current being carried by the ground blade 22 to assist in holding the switch blade 22 in the engaged position with respect to the associated stationary contact assembly 150 in the event that the terminal T1 of the disconnecting switch 40 should be inadvertently reenergized after the grounding switch 20 has been actuated to the closed position.

In considering the operation of the grounding switch 20, it will be assumed that initially the switch blade 102 of the disconnecting swtich 40 is in a substantially vertical open position as previously described and that the terminal T1 at the break end of the disconnecting switch 40 is deenergized. In a particular application, the terminal T2 at the other or hinge end of the disconnecting switch 40 may remain energized at a high potential during the assumed operating condition. It will also be assumed initially that the switch blade 22 of the grounding switch 20 is in a normally open position which is substantially horizontal, as illustrated, with the auxiliary blade portion 24 being disposed at an obtuse angle with respect to the longitudinal axis of the switch blade 22, as shown in FIG. 1, to which the auxiliary blade portion 24 is actuated by the biasing or projecting member 26. It is important to note that the switch blade 22 lies generally in the same vertical plane as that in which the insulator stacks 31, 32 and 33 lie and in which the arcuate travel of the switch blade 102 of the main disconnecting switch 40 occurs between the open and closed positions. It is to be understood that in certain applications, the normally open position of the switch blade 22 as illustrated may be slightly spaced from the vertical plane in which the switch blade 102 travels but substantially parallel to the plane, as indicated in FIG. 1.

During a closing operation of the grounding switch 20, the hand crank 42 shown in FIG. 3 may be manually turned or rotated to apply a driving torque through the gear assembly 43 to the substantially vertical drive shaft 46. The driving torque at the shaft 46 is transmitted through the gear assembly 48 to the output shaft 47 of the gear assembly 48 and through the coupling 49 to the input shaft 202 of the gear assembly 200. The driving torque at the input shaft 202 of the gear assembly 200 is transmitted through the gear assembly 200 to the output shaft 232 of the gear assembly 200 on which the switch blade 22 of the grounding switch 20 is supported. The switch blade 22 of the grounding switch 20 then starts to rotate out of or transversely away from the substantially vertical plane in which the switch blade 102 of the main disconnecting switch 40 travels from the position shown in FIG. 1 in a generally clockwise direction about the left end of the switch blade 22 as viewed in FIG. 1. Because of the angular mounting of the switch blade 22 on the shaft 232, the switch blade 22 rotates with the shaft 232 along a generally conical surface or path which is defined by the movement of the switch blade 22 from a substantially horizontal normally open position as shown in FIG. 1 to a substantially vertical position as indicated in phantom at 22″ in FIG. 2 in which the auxiliary blade portion 24 at the free end of the switch blade 22 engages the relatively stationary contact assembly 150 which includes a plurality of pairs of opposed, spring biased, contact fingers, as described in my copending application previously mentioned. It is important to note that as soon as the switch blade 22 starts to rotate from the position shown in FIG. 1, the switch blade 22 moves out of or transversely away from the substantially vertical plane in which the switch blade 102 of the main disconnecting switch 40 rotates and travels in a generally conical path as just mentioned which is indicated by the intermediate position of the switch blade at 22′ in phantom in FIG. 1 and finally reaches the position shown in FIG. 3 just prior to the engagement of the auxiliary blade portion 24 with the contact fingers of the relatively stationary contact assembly 150. It is important to note in FIG. 3 that because of the angular position of the auxiliary blade portion 24 with respect to the longitudinal axis of the switch blade 22, the upper end of the auxiliary blade portion 24, as viewed in FIG. 3, is underneath the contact assembly 150 to facilitate the entrance of the auxiliary blade portion 24 between the contact fingers of the contact assembly 150. As the switch blade 22 is further rotated in a counterclockwise direction as viewed in FIG. 3, the stop pin 27 on the auxiliary blade portion 24 will engage one side of the slot 29 at the upper end of the switch blade 22 to prevent further rotation of the auxiliary blade portion 24 with respect to the switch blade 22. The auxiliary blade portion 24 will then be forced upwardly between the contact fingers of the contact assembly 150 to establish adequate contact presssure between the switch blade 22 and the contact assembly 150 until the auxiliary blade portion 24 is substantially aligned axially with the switch blade 22. As previously mentioned, the final portion of the closing movement of the switch blade 22 would be guided by the blade guide members 152 and 153 each of which includes a generally V-shaped slot to guide the movement of the upper end of the switch blade 22 and the associated auxiliary blade portion 24. It is important to note that during the final portion of the travel of the switch blade 22 toward a fully closed position with respect to the associated contact assembly 150, the switch blade 22 is travelling generally transversely to the substantially vertical plane in which the blade 102 of the main disconnecting switch 40 travels and that the switch blade 22 ultimately reaches a closed position in which the switch blade 22 is again disposed in generally the same vertical plane as that in which the switch blade 102 of the main disconnecting switch 40 travels.

As previously mentioned, the other terminal T2 of the disconnecting switch 40 may remain energized at a relatively high potential duirng a closing operation of the grounding switch 20 as just described, while the switch blade 102 of the main disconnecting switch 40 is in the substantially vertical open position. It is important to note that during the travel of the switch blade 22 of the grounding switch 20 as just described along a generally conical surface from the normally open position shown in FIG. 1 to the substantially vertical closed position which is indicated in phantom at 22″ in FIG. 2, the free end of the switch blade 22 at the end of the associated auxiliary blade portion 24 does not approach the electrically conducting parts at the hinge end of the main disconnecting switch 40 closer than the distance between the free end of the switch blade 22 at the end of its associated auxiliary blade portion 24 in the open position. In other words, the free end of the switch blade 22, including the blade portion 24, of the grounding switch 20 remains at substantially the same distance from the conducting parts of the disconnecting switch 40 at the hinge end during the entire travel of the switch blade 22 from the normally open position shown in FIG. 1 to the fully closed position indicated in the phantom at 22″ in FIG. 2 to thereby maintain the necessary electrical clearances or withstand voltages required by industry standards for high voltage grounding switches. It is to be noted that the apex of the generally conical path or trajectory followed by the switch blade 22 during either a closing or opening operation lies substantially at the point on the shaft 232 at which the switch blade 22 is supported.

During an opening operation of the grounding switch 20, it is assumed initially that the switch blade 22 of the grounding switch 20 is in the substantially vertical closed position indicated in phantom at 22″ in FIG. 2 and that the auxiliary blade portion 24 at the upper end of the switch blade 22, as most nearly shown in FIG. 3, is substantially aligned with the longitudinal axis of the switch blade 22. When the hand crank 42 is manually turned or rotated to apply a driving torque to the output shaft 232 of the gear assembly 200 as previously explained, the switch blade 22 of the grounding switch 20 will rotate from a substantially vertical position generally out of the substantially vertical plane in which the switch blade 102 of the main disconnecting switch 40 travels with the auxiliary blade portion 24 initially remaining in engagement with the contact fingers of the contact assembly 150 and with the upper end of the auxiliary blade portion 24 gradually dropping until the upper end of the auxiliary blade portion 24 clears the contact fingers of the contact assembly 150. During an opening operation of the grounding switch 20, the auxiliary blade portion 24 as shown in FIG. 3 will be angularly rotated with respect to the main switch blade 22 during the initial portion of the opening movement of the switch blade 22 until the stop pin 27 on the auxiliary blade portion 24 is engaged by the other side of the slot 29 provided at the upper end of the switch blade 22. After the auxiliary blade portion 24 reaches the limit of its rotational travel with respect to the switch blade 22, the switch blade 22 and the auxiliary blade portion 24 will travel along the generally conical path of the surface previously described until the switch blade 22 is rotated about the axis of the shaft 232 and reaches the normally open position shown in FIG. 1 with the switch blade 22 again approaching the substantially vertical plane in which the switch blade 102 of the main disconnecting switch 40 travels generally transversely with respect to the latter plane until the switch blade 22 reaches the final normally open position which is substantially horizontal as shown in FIGS. 1 and 2 with the switch blade 22 returning to a normally open position which is generally in the same plane as that in which the switch blade 102 of the main disconnecting switch 40 travels.

It is to be noted that the construction of the auxiliary blade portion 24 at the upper end of the switch blade 22 facilitates the release of the contact pressure between the switch blade 22 and the contact assembly 150 since the auxiliary blade portion 24 initially rotates to a predetermined angular position with respect to the blade 22 which is controlled by the size of the slot 29 and the position of the stop pin 27 drops downwardly during the initial opening rotation of the switch blade 22 and then clears the contact assembly 150 as the switch blade 22 is rotated further toward the open position. As previously mentioned, the biasing member 26 is provided to insure that the auxiliary blade portion 24 assumes the desired angular position with respect to the longitudinal axis of the switch blade 22 in the normally open position with the auxiliary blade portion 24 being held frictionally in the desired angular position by the spring washers which may be provided as required in a particular application on the pivot pin 23.

Considering the operation of the switch blade 22 and the auxiliary blade portion 24 as a toggle means, the toggle means is normally maintained in a partially collapsed condition when the blade 22 is in the open position shown in FIG. 1. During a closing operation, the toggle means which includes the blade 22 and the auxiliary blade portion 24 is actuated to substantially an over-center condition as the auxiliary blade portion 24 fully engages the contact assembly 150. During an opening operation, the toggle means which includes the blade 22 and the auxiliary blade portion 24 is initially partially collapsed to a predetermined degree to facilitate the release of the contact pressure between the blade portion 24 and the contact assembly 150.

It is to be understood that in a particular application the disconnecting switch 40 and the grounding switch 20 as disclosed may comprise one pole of a three-phase high voltage switch structure in which the other pole units of the three-phase switch structure may be disposed in side by side relation or laterally spaced from the disconnecting switch 40 and the associated grounding switch 20. More specifically, the output shaft 47 of the gear assembly 48 shown in FIG. 3 may be extended axially to be mechanically coupled or operatively connected to the other pole units of a three-phase switch structure with only a single hand crank 42 and a single vertical drive shaft 46 being required in a particular application. It is also to be understood that the grounding switch structure as disclosed may be employed with other orientations of an associated disconnecting switch in which the switch blade of the grounding switch is actuated between a first position in generally a predetermined plane and a second position lying in generally the same predetermined plane but angularly displaced from the first position. It is to be further understood that the grounding switch structure as disclosed may be employed with other types of disconnecting switch structures than that specifically disclosed in which the disconnecting switch parts operate generally in a predetermined plane. Finally, it is to be understood that a grounding switch structure as disclosed may be employed to ground either the hinge end or the break end of the associated main disconnecting switch by mounting the stationary contact assembly at the appropriate end of the associated disconnecting switch.

The apparatus embodying the teachings of this invention has several advantages. For example, the switch blade of a grounding switch is disposed in generally the same plane as the switch blade as the associated disconnecting switch or slightly spaced therefrom but generally parallel to the plane of travel of the associated disconnecting switch as disclosed which is in a convenient protected location which does not interfere with other equipment in a high voltage substation. In addition, the disclosed grounding switch construction maintains a minimum electrical clearance between the free end of the overall switch blade of the grounding switch and the operating parts of the associated disconnecting switch which may be energized at relatively high potentials in both the open and closed positions and at all points in between the open and closed positions at substantially the same electrical clearance or withstand voltage rating which corresponds to a particular electrical clearance. Finally, the desirable characteristics of grounding switches disclosed are obtained with a relatively simple operating mechanism construction in which the switch blade of the grounding switch is permitted to rotate about only a single fixed axis which avoids the complexities and problems of more complicated mechanical structures which have been proposed in the past for grounding switches of the same general type. In addition, a grounding switch structure as disclosed provides actuate contact pressure between the switch blade and the associated contact assembly without requiring the rotation of the switch blade of the grounding switch about its own axis during opening or closing.

Since numerous changes may be made in the above described apparatus and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. A switch structure comprising an elongated switch blade supported adjacent to one end on a rotatable shaft for rotation therewith about a fixed axis, the angle between the axis of the shaft and the axis of the blade being substantially 45°, said fixed axis of the rotatable shaft being substantially displaced from both a horizontal axis and a vertical axis, means for actuating the rotation of the shaft to rotate the blade between a first position in which the blade is disposed generally in a predetermined plane along a generally conical path out of said plane and a second position in which the blade is disposed generally in said plane and displaced from the first position, and relatively stationary contact means disposed generally in said plane and spaced from said one end of said blade to be engaged by said blade adjacent to the other end in the second position of said blade.

2. The combination as claimed in claim 1 wherein the fixed axis of the rotatable shaft is angularly displaced from a horizontal axis by an angle of substantially 45°.

3. A switch structure comprising an elongated switch blade supported adjacent to one end on a rotatable shaft for rotation therewith about a fixed axis, the angle between the axis of the shaft and the axis of the blade being substantially 45°, means for actuating the rotation of the shaft to rotate the blade between a first position in which the blade is disposed generally in a predetermined plane along a generally conical path out of said plane and a second position in which the blade is disposed generally in said plane and displaced from the first position, said means for actuating the rotatable shaft including a driving shaft disposed generally transversely to the rotatable shaft and having a hypoid type gear mounted thereon, the rotatable shaft having a gear mounted therein which is engaged by the hypoid type gear on the driving shaft, and relatively stationary contact means disposed generally in said plane and spaced from said one end of said blade to be engaged by said blade adjacent to the other end in the second position of said blade.

4. A switch structure comprising an elongated switch blade supported adjacent to one end on a rotatable shaft for rotation therewith about a fixed axis, the angle between the axis of the shaft and the axis of the blade being substantially 45°, means for actuating the rotation of the shaft to rotate the blade between a first position in which the blade is disposed generally in a predetermined plane along a generally conical path out of said plane and a second position in which the blade is disposed generally in said plane and displaced from the first position, said rotatable shaft being disposed in generally the same plane as that in which the blade is generally disposed in both the first and second operating positions, and relatively stationary contact means disposed generally in said plane and spaced from said one end of said blade to be engaged by said blade adjacent to the other end in the second position of said blade.

5. In combination, a disconnecting switch comprising at least first and second spaced, substantially parallel insulator stacks, a main switch blade mounted on at least one of the insulator stacks for rotation in a plane in which the first and second insulator stacks generally lie, a ground switch blade supported near one end on a rotatable shaft disposed adjacent to the end of one of the insulator stacks away from the main switch blade for rotation therewith about a fixed axis, the angle between the axis of the rotatable shaft and the axis of the ground switch blade being substantially 45°, means for rotating the shaft to rotate the ground switch blade between a first position in which the ground switch blade is disposed generally in said plane generally perpendicular to both of said insulator stacks along a generally conical path out of said plane and a second position in which the ground switch blade is disposed generally in said plane and substantially parallel to the insulator stack adjacent to the rotatable shaft, and relatively stationary ground contact means disposed on the last-mentioned insulator stack to be engaged by the other end of the ground switch blade in the second position.

6. The combination as claimed in claim 5 wherein the fixed axis of the rotatable shaft is substantially displaced from both a horizontal axis and a vertical axis.

7. The combination as claimed in claim 5 wherein the insulator stacks are substantially vertical and the fixed axis of the rotatable shaft is angularly displaced from a horizontal axis by an angle of substantially 45°.

8. The combination as claimed in claim 5 wherein the rotatable shaft is disposed in generally the same plane as that in which the ground switch blade is generally disposed in both the first and second positions.

9. The combination as claimed in claim 5 wherein the means for rotating the shaft on which the ground switch blade is supported includes a driving shaft disposed generally perpendicular to the supporting shaft for the ground switch blade and having a hypoid type gear mounted thereon, the supporting shaft for the ground switch blade having a gear mounted thereon which is engaged by the hypoid type gear on the driving shaft.

References Cited

UNITED STATES PATENTS 3,288,955  11/1966  Turgeon _____ 200—48

FOREIGN PATENTS 1,059,070  11/1953  Germany.

ROBERT K. SCHAEFER, Primary Examiner

H. J. HOHAUSER, Assistant Examiner